United States Patent
Ishibashi et al.

(10) Patent No.: US 9,916,048 B2
(45) Date of Patent: Mar. 13, 2018

(54) INPUT DISPLAY DEVICE

(71) Applicant: NITTO DENKO CORPORATION, Ibaraki, Osaka (JP)

(72) Inventors: Kuniaki Ishibashi, Ibaraki (JP); Akiko Sugino, Ibaraki (JP); Tsuyoshi Chiba, Ibaraki (JP); Masakuni Fujita, Ibaraki (JP); Takashi Yamaoka, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 272 days.

(21) Appl. No.: 13/677,780

(22) Filed: Nov. 15, 2012

(65) Prior Publication Data
US 2013/0120314 A1    May 16, 2013

(30) Foreign Application Priority Data

Nov. 16, 2011    (JP) .................................. 2011-250902

(51) Int. Cl.
*G06F 3/044* (2006.01)
*G02B 5/30* (2006.01)
(Continued)

(52) U.S. Cl.
CPC .......... *G06F 3/044* (2013.01); *G02F 1/13338* (2013.01); *G06F 3/0412* (2013.01);
(Continued)

(58) Field of Classification Search
CPC .... G02F 1/13338; G06F 3/0412; G06F 3/044; G02B 1/111; G02B 5/3033
(Continued)

(56) References Cited

U.S. PATENT DOCUMENTS

2003/0031838 A1* 2/2003 Bourdelais ............. G09F 3/10
                                                    428/195.1
2004/0119920 A1   6/2004 Uesaka et al.
(Continued)

FOREIGN PATENT DOCUMENTS

CN    1916704 A    2/2007
CN    2901418 Y    5/2007
(Continued)

OTHER PUBLICATIONS

Korean Decision to Grant a Patent dated Sep. 29, 2014, issued in corresponding Korean Application No. 10-2012-0116120; w/ English Translation.
(Continued)

*Primary Examiner* — Lin Li
(74) *Attorney, Agent, or Firm* — Westerman, Hattori, Daniels & Adrian, LLP

(57) ABSTRACT

An input display device includes a liquid crystal layer containing liquid crystal molecules that are homogeneously aligned in an absence of an electric field, a first polarizer disposed on a viewing side of the liquid crystal layer, a capacitive sensor disposed between the first polarizer and the liquid crystal layer, and an antistatic layer disposed between the first polarizer and the capacitive sensor, the antistatic layer being attached to the first polarizer. The capacitive sensor has a transparent substrate, a transparent electrode pattern formed on the transparent substrate, and a first adhesive layer formed on the transparent substrate to embed the transparent electrode pattern, and the antistatic layer has a surface resistance value of $1.0 \times 10^9$ to $1.0 \times 10^{11} \Omega/\square$.

5 Claims, 2 Drawing Sheets

(51) Int. Cl.
  *G02B 1/11* (2015.01)
  *G06F 3/041* (2006.01)
  *G02F 1/133* (2006.01)
  *B32B 27/08* (2006.01)
  *G02F 1/1333* (2006.01)
  *G02F 1/1337* (2006.01)

(52) U.S. Cl.
  CPC ............ *G02F 2001/133738* (2013.01); *G02F 2202/22* (2013.01)

(58) Field of Classification Search
  USPC ......... 359/485.01; 428/339; 257/75; 349/96; 324/686; 345/173, 176
  See application file for complete search history.

(56) References Cited

U.S. PATENT DOCUMENTS

| | | | |
|---|---|---|---|
| 2004/0209007 A1* | 10/2004 | Satake | B32B 27/08 428/1.3 |
| 2006/0108050 A1* | 5/2006 | Satake et al. | 156/101 |
| 2007/0002192 A1* | 1/2007 | Nishino | G02F 1/13338 349/12 |
| 2007/0040816 A1 | 2/2007 | Toyomaki | |
| 2009/0022988 A1* | 1/2009 | Toyama | C08G 18/289 428/355 CN |
| 2009/0103016 A1* | 4/2009 | Shutou | G02B 5/3033 349/96 |
| 2009/0146945 A1* | 6/2009 | Cho | G06F 3/044 345/104 |
| 2009/0246416 A1* | 10/2009 | Kawabe | C08K 5/1535 428/1.31 |
| 2009/0303602 A1* | 12/2009 | Bright | G02B 1/111 359/585 |
| 2010/0080967 A1 | 4/2010 | Hu et al. | |
| 2010/0182273 A1 | 7/2010 | Noguchi et al. | |
| 2010/0188620 A1* | 7/2010 | Kim | C09J 133/08 349/96 |
| 2011/0181813 A1* | 7/2011 | Kim | G02F 1/133528 349/96 |
| 2011/0228188 A1 | 9/2011 | Kim et al. | |
| 2011/0235230 A1 | 9/2011 | Lee et al. | |
| 2011/0285640 A1* | 11/2011 | Park et al. | 345/173 |
| 2012/0044176 A1* | 2/2012 | Nakamura | G06F 3/0412 345/173 |
| 2012/0064325 A1* | 3/2012 | Fumoto | C09J 7/0296 428/220 |
| 2012/0127578 A1* | 5/2012 | Bright | G02B 1/116 359/585 |
| 2012/0249928 A1* | 10/2012 | Kaihoko | G02B 5/3083 349/69 |

FOREIGN PATENT DOCUMENTS

| | | |
|---|---|---|
| CN | 101802122 A | 8/2010 |
| CN | 102207786 A | 10/2011 |
| JP | 9-105918 A | 4/1997 |
| JP | 2002-311426 A | 10/2002 |
| JP | 2003-036143 A | 2/2003 |
| JP | 2007-52183 A | 3/2007 |
| JP | 2009-244958 A | 10/2009 |
| JP | 2010-181747 A | 8/2010 |
| JP | 2011-22340 A | 2/2011 |
| JP | 2011-173984 A | 9/2011 |
| JP | 2012-43201 A | 3/2012 |
| KR | 10-2010-009510 A | 1/2010 |
| KR | 10-2011-0039182 A | 4/2011 |
| KR | 10-2011-0105613 A | 9/2011 |
| TW | 201128242 A1 | 8/2011 |

OTHER PUBLICATIONS

Taiwanese Office Action dated Oct. 7, 2014, issued in corresponding Taiwanese Application No. 101142701; w/ English Translation.
Korean Office Action dated Jan. 29, 2014, issued in Korean Patent Application No. 10-2012-0116120, w/English translation (7 pages).
Office Action dated Dec. 3, 2104, issued in corresponding Chinese Patent Application No. 201210424573.8, with English Translation (12 pages).
Approval Decision Letter dated May 11, 2015, issued in corresponding Taiwanese Patent Application No. 101142701 with English translation (5 pages).
Extended European Search Report dated Feb. 24, 2015, issued in corresponding EP Patent Application No. 12192372.6 (6 pages).
Chinese Office Action dated Oct. 27, 2015 issued in counterpart Chinese patent application No. 201210424573.8, with English translation. (11 pages).
Office action dated Aug. 3, 2015, issued in counterpart Japanese Appilcation No. 2011-250902, with English translation (7 pages).
Decision to Grant a Patent dated Feb. 22, 2016, issued in counterpart Japanese Patent Application No. 2011-250902, with English translation. (5 pages).

* cited by examiner

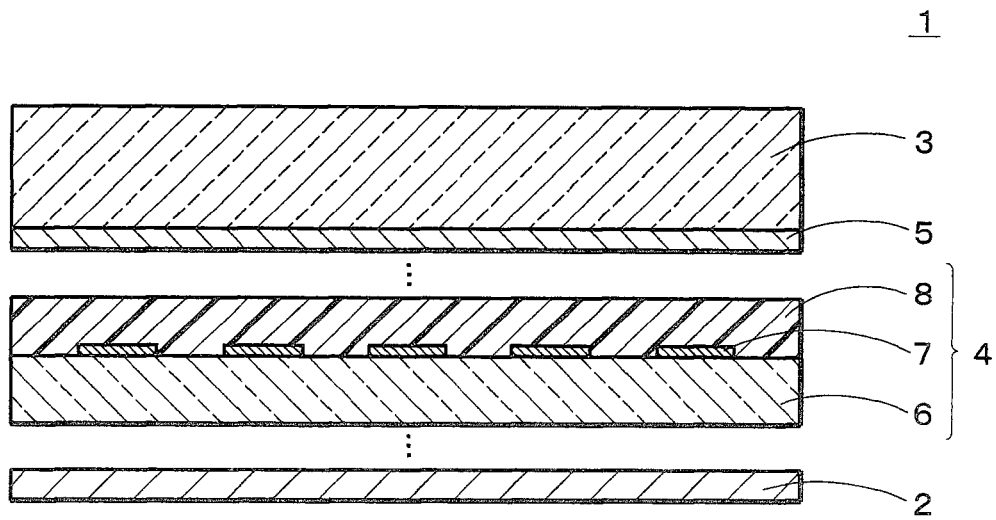
F I G. 1
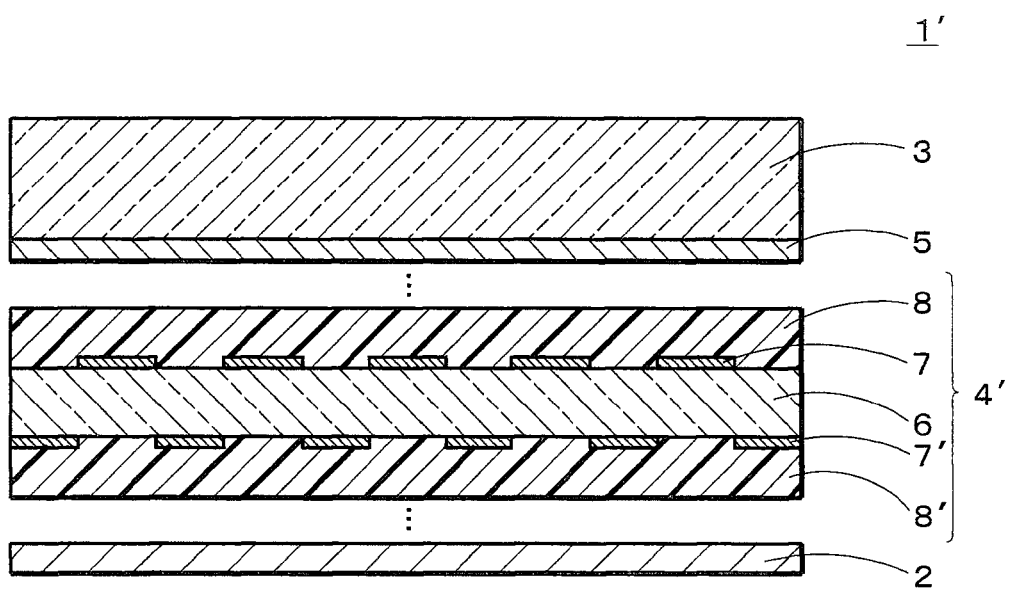
F I G. 2

INPUT DISPLAY DEVICE

CROSS REFERENCE TO RELATED APPLICATIONS

This application claims the benefit of Japanese Application No. 2011-250902, filed Nov. 16, 2011, which is hereby incorporated by reference herein in its entirety.

BACKGROUND OF INVENTION

Field of the Invention

The present invention relates to an input display device that is capable of inputting information by a touch with a finger, a stylus pen or the like.

Background of the Invention

In the related art, there are some input display apparatuses, such as mobile equipments provided with a liquid crystal panel as a display, that have a touch panel mounted on a display screen of the display to satisfy the need for a reduced size or thickness and put into practical use. There are various types of touch panels such as a capacitive type, a resistive film type, an optical type, an ultrasonic type, and an electromagnetic induction type.

For example, an inner touch panel-type input display device has been proposed in which a resistive layer type touch film is assembled between a polarizer and a liquid crystal layer constituting a liquid crystal device (see Japanese Laid-Open Patent Application (Kokai) No. 2003-036143, for example). With an input display device of such a structure, since a distance between the liquid crystal layer and the touch sensor is small, it is possible to give a natural input feel to a user. With regards to mobile equipment, since the touch sensor operates very frequently, many capacitive sensor type touch panels are being employed recently due to an advantage that they have a good durability.

However, with the capacitive type, in a case where a liquid crystal layer containing liquid crystal molecules that are homogeneously aligned in an absence of an electric field is used as a liquid crystal layer and a capacitive sensor is used as a touch sensor, there is a problem that a display defect or malfunctioning may occur often.

SUMMARY OF INVENTION

An object of the invention is to provide an input display device capable of reducing occurrence of a display defect and occurrence of malfunctioning without loosing a natural operation feel.

In order to achieve the above object, according to an aspect of the invention, an input display device includes a liquid crystal layer containing liquid crystal molecules that are homogeneously aligned in an absence of an electric field, a first polarizer disposed on a viewing side of the liquid crystal layer, a capacitive sensor disposed between the first polarizer and the liquid crystal layer, and an antistatic layer disposed between the first polarizer and the capacitive sensor, the antistatic layer being attached to the first polarizer, wherein the capacitive sensor has a transparent substrate, a transparent electrode pattern formed on the transparent substrate, and a first adhesive layer formed on the transparent substrate to embed the transparent electrode pattern, and wherein the antistatic layer has a surface resistance value of $1.0 \times 10^9$ to $1.0 \times 10^{11} \Omega/\square$.

Preferably, the input display device of the aspect of the invention further includes a retardation film that widens a viewing angle on the viewing side, the retardation film being disposed between the antistatic layer and the first adhesive layer.

Further, a second polarizer may be disposed on a side of the liquid crystal layer opposite to the viewing side via a second adhesive layer.

Preferably, the antistatic layer includes any one of a surface active agent, an alkaline metal salt, a polyhydric alcohol, a conductive fine particle and a conductive polymer, and further preferably, the alkaline metal salt is bis(trifluoroalkanesulfonyl)imide alkaline metal salt.

According to the invention, a antistatic layer having a surface resistance value of $1.0 \times 10^9$ to $1.0 \times 10^{11} \Omega/\square$ is disposed between a liquid crystal layer containing liquid crystal molecules that are homogeneously aligned in an absence of an electric field and a first polarizer. Thus, the charging of the first polarizer due to a static electricity or the like can be suppressed and misalignment of the liquid crystal molecules in the liquid crystal layer can be suppressed. Further, with the surface resistance value being within the aforementioned range, the capacitive sensor can accurately sense a change in the electric capacitance produced between the transparent electrode pattern and the user's finger. Therefore, it is possible to reduce occurrence of the display defect as well as occurrence of the malfunctioning, without impairing a natural feel of operation.

Further features of the present invention will become apparent from the following detailed description of exemplary embodiments with reference to the attached drawings.

BRIEF DESCRIPTION OF DRAWINGS

FIG. 1 is a cross-sectional view schematically showing a configuration of an input display device of an embodiment of the invention.

FIG. 2 is a cross-sectional view illustrating a variant of the input display device of FIG. 1.

DETAILED DESCRIPTION

Figure 3:
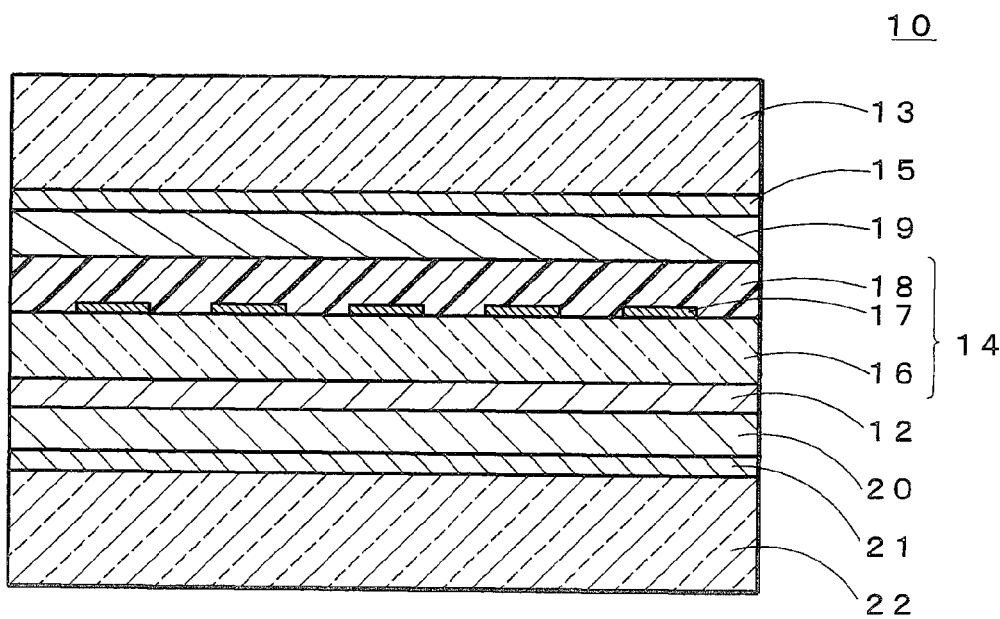
FIG. 3 is a cross-sectional view illustrating another variant of the input display device of FIG. 1.

Hereinafter, embodiments of the present invention will be described in detail with reference to the drawings.

FIG. 1 is a cross-sectional view schematically showing a configuration of an input display device of an embodiment of the present invention. In FIG. 1, for the sake of convenience of explanation, each layer constituting the input display device is shown with a thickness different from the actual thickness, and the thickness of each layer is not limited to the thickness shown in FIG. 1.

As shown in FIG. 1, the input display device 1 of the present invention is comprised of a liquid crystal layer 2 containing liquid crystal molecules that are homogeneously aligned in an absence of an electric field, a polarizer (first polarizer) 3 disposed on a viewing side of the liquid crystal layer, a capacitive sensor 4 disposed between the polarizer and the liquid crystal layer 2, and an antistatic layer 5 disposed between the capacitive sensor and the polarizer 3 and attached to the polarizer 3.

The capacitive sensor 4 has a transparent substrate 6, a transparent electrode pattern 7 formed on the transparent substrate, and an adhesive layer (first adhesive layer) 8 formed on the transparent substrate to embed the transparent electrode pattern.

With the input display device 1 of the aforementioned structure, it is possible to reduce both a display defect in the liquid crystal layer 2 and a malfunctioning of the capacitance sensor 4 which may occur when a static electricity is built up in the polarizer 3.

Generally, the liquid crystal layer containing liquid crystal molecules that are homogeneously aligned in an absence of an electric field (for example, a liquid crystal layer of an IPS type) performs the displaying by rotating the liquid crystal molecules in a horizontal direction by applying an electric field in a horizontal direction. At this time, if a static electricity is built up in the polarizer, a display defect may occur since an electric field in a vertical direction will be applied to the liquid crystal layer at the charged portion and the liquid crystal molecules will be partly aligned in the vertical direction.

The capacitive sensor detects, when a user's finger comes close to its surface, a weak electrostatic capacitance produced with the transparent electrode pattern and the finger. Here, if a conductive layer such as the antistatic layer exists between the transparent electrode pattern and the finger of the user, a desired capacitance cannot be obtained and may cause a malfunction.

Therefore, there is a trade-off between the problems of the display defect in the liquid crystal layer and the malfunctioning of the capacitive sensor which may occur when a static electricity is built up in the polarizer, and it was very difficult to solve these problems at the same time.

The present inventors have carried out assiduous studies to attain the above object, and, as a result, focused on a relationship between the display defect of the liquid crystal layer and the surface resistance value of the antistatic layer, as well as the relationship between the malfunctioning of the capacitive sensor and the surface resistance value of the antistatic layer. As a result, the present inventors have reached the findings that the two problems in a trade-off relationship are solved simultaneously by setting a surface resistance value of the antistatic layer disposed at a specific position to a specific value.

Next, a detail of each constituent element of the input display device 1 will be described below.

(Liquid Crystal Layer)

The liquid crystal layer used in the present invention is a liquid crystal layer of a so-called IPS (In-Plane Switching) type containing liquid crystal molecules that are homogeneously aligned in an absence of an electric field. The liquid crystal layer has a thickness of, for example, 1.5 μm to 4.0 μm.

In general, an upper substrate (not shown) is disposed at an upper side of the liquid crystal layer and a lower substrate (not shown) is disposed at a lower side of the liquid crystal layer. In general, a comb electrode (not shown) for producing a horizontal electric field in the liquid crystal layer is formed at one side of the upper or lower substrate.

(Polarizer)

The polarizer used in the present invention is disposed on a viewing side of the liquid crystal layer. The polarizer has a function of separating light which is input to the polarizer into two polarized components that are mutually orthogonal, transmitting one of the polarized components and absorbing the other one of the polarized components. The polarizer has an absorption axis and a transmission axis that are lying in a plane. The absorption axis lies in a direction in which absorption of an incident light is maximized and the transmission axis lies in a direction in which transmission of the light is maximized. Generally, the absorption axis and the transmission axis are mutually orthogonal.

The polarizer is preferably a laminated body including a stretched film of polyvinyl alcohol resin containing a dichroic element and a protection film disposed on one side of the stretched film, but not particularly limited thereto as long as it has the aforementioned function. Generally, the stretched film has a thickness of 1.0 μm to 30 μm. Generally, the protection film has a thickness of 20 μm to 150 μm. Such a polarizer is available from, for example, Nitto Denko Corporation (product name: NPF (Registered Trademark) 1224DU).

(Antistatic Layer)

The antistatic layer used in the present invention is disposed between the polarizer and the capacitive sensor, and attached to the polarizer. The antistatic layer has a thickness of, for example, 0.1 μm to 80 μm. The antistatic layer has a surface resistance value per unit area of $1.0 \times 10^9$ to $1.0 \times 10^{11} \Omega/\square$ (ohms per square). When the surface resistance value of the antistatic layer is less than $1.0 \times 10^9 \Omega/\square$, the malfunctioning of the capacitive sensor occurs, and on the other hand, when the surface resistance value exceeds $1.0 \times 10^{11} \Omega/\square$, the display defect in the liquid crystal layer occurs.

Therefore, by using an antistatic layer having the surface resistance value in the aforementioned range, it is possible to reduce both the display defect in the liquid crystal layer and the malfunctioning of the capacitive sensor that occur when static electricity is built up in the polarizer.

The antistatic layer is made of a material having, for example, an acrylic resin as its main component and preferably contains an antistatic agent. The antistatic layer may be formed by affixing a pressure sensitive adhesive (PSA), in which an antistatic agent is dispersed, to the polarizer, or formed by applying the antistatic agent to the polarizer by mixing the antistatic agent into an arbitrary coating agent or a solvent, or directly without dilution.

The antistatic layer has a thickness of, for example, 10 μm to 80 μm in a case where a pressure-sensitive adhesive in which the antistatic agent is dispersed is used, and a thickness of, for example, 0.1 μm to 10 μm in a case where it is formed by mixing the antistatic agent into a coating agent or a solvent and applied, or, directly applied without dilution.

The antistatic layer preferably contains any one of a surface active agent, an alkaline metal salt, a polyhydric alcohol, conductive fine particles and a conductive polymer, and further preferably contains bis(trifluoroalkanesulfonyl) imide alkaline metal salt as the alkaline metal salt. The antistatic layer is, for example, available from Tokyo Chemical Industry Co., Ltd.

The surface active agent may be an anionic or amphoteric surface active agent such as a sulfonic acid compound or a non-ionic surface active agent such as ethylene oxide. The polyhydric alcohol may be an esterification reactant such as polyethylene glycol. The conductive fine particles may be conductive carbon black (CB) or carbon nanotubes (CNTs), and the conductive polymer may be polyaniline, polyethylenedioxythiophene or polypyrrole.

The surface resistance value of the antistatic layer can be increased or decreased, where appropriate, by changing a type or an amount of content of the antistatic agent.

(Capacitive Sensor)

The capacitive sensor used in the present invention is disposed between the polarizer and the liquid crystal layer.

The capacitive sensor has a transparent substrate, a transparent electrode pattern formed on the transparent substrate, and an adhesive layer formed on the transparent substrate to embed the transparent electrode pattern. The transparent electrode pattern is, in general, electrically connected to a wiring (not shown) formed at an edge portion of the transparent substrate and the wiring is connected to a controller IC (not shown).

As shown in FIG. 2, the capacitive sensor may include, on a side of the transparent substrate 6 opposite to the transparent electrode pattern 7, a transparent electrode pattern 7' and an adhesive layer 8' that is formed to embed the transparent electrode pattern. In such a case, the transparent substrate 6, the transparent electrode patterns 7, 7' and the adhesive layers 8, 8' constitute the capacitive sensor 4'. In other words, the antistatic layer can be employed in a surface capacitive type as well as a projected capacitive type.

A material that forms the transparent substrate is, in general, glass or a polymer film. The polymer film is preferably made of polyethylene terephthalate, polycycloolefin or polycarbonate. When the transparent substrate is made of glass, it has a thickness of, for example, 0.3 mm to 1.0 mm. When the transparent substrate is made of a polymer film, it has a thickness of, for example, 10 μm to 200 μm. The transparent substrate may be provided with an easy adhesion layer or a hard coat layer on its surface. The transparent substrate may also serve as an upper substrate for retaining the aforementioned liquid crystal layer.

The transparent electrode pattern is typically formed from a transparent conductor. The transparent conductor is a material that has a transmissivity of greater than or equal to 80% in a visible light region (380 nm 780 nm) and a surface resistance value of less than or equal to 500Ω/□. Preferably, the transparent conductor is made of indium tin oxide, indium zinc oxide, or a composite oxide of indium oxide-zinc oxide.

The shape of the transparent electrode pattern is not limited to a comb shape, and any shape such as a striped shape or a diamond shape may be employed depending on the use. The transparent electrode pattern has a height of, for example, 10 nm to 100 nm and a width of 0.1 mm to 5.0 mm.

Also, the adhesive layer is formed on the transparent substrate to embed the transparent electrode pattern. A material that forms the adhesive layer is preferably an acrylic adhesive agent, since it has a high transparency. Preferably, the acrylic adhesive agent has a thickness of 10 μm to 200 μm. A commercially available optical clear adhesive (OCA) may be employed as the adhesive layer. Such an acrylic adhesive agent is available from, for example, Nitto Denko Corporation (product name: LUCIACS (Registered Trademark) CS9621T).

As has been described above, according to the present embodiment, the antistatic layer 5 having a surface resistance value of $1.0 \times 10^9$ to $1.0 \times 10^{11} \Omega/\square$ is disposed between the liquid crystal layer 2 containing liquid crystal molecules that are homogeneously aligned in an absence of an electric field and the polarizer 3. Accordingly, charging of the polarizer 3 due to static electricity or the like is suppressed, and thus a local alignment defect of liquid crystal molecules in the liquid crystal layer 2 can be suppressed. Further, by setting the surface resistance value to be within the aforementioned range, the capacitive sensor 4 can accurately sense a change in the static capacitance that occurs between the transparent electrode pattern 7 and the user's finger. Therefore, it is possible to reduce occurrence of the display defect as well as occurrence of the malfunctioning, without impairing a natural feel of operation which is specific to the capacitive type.

In the foregoing, the input display device of the present embodiment has been described, however, the present invention is not limited to the embodiment described above, and various modifications and alternations are conceivable based on the technical idea of the invention.

FIG. 3 is a diagram illustrating a variant of the input display device of FIG. 1.

Referring to FIG. 3, the input display device 10 is comprised of a liquid crystal layer 12, a first polarizer 13 disposed on a viewing side of the liquid crystal layer, a capacitive sensor 14 disposed between the first polarizer and the liquid crystal layer 12, and an antistatic layer 15 disposed between the capacitive sensor and the first polarizer 13 and attached to the first polarizer 13. The capacitive sensor 14 has an upper transparent substrate 16, a transparent electrode pattern 17 and a first adhesive layer 18.

The structure differs from that of FIG. 1 in that, between the capacitive sensor 14 and the antistatic layer 15, a retardation film 19 is disposed which compensates for geometric axis misalignment of the polarizer which may occur when observed from an oblique direction. Also, a lower transparent substrate 20 and a second polarizer 22 laminated on the lower substrate via a second adhesive layer 21 are disposed on a side of the liquid crystal layer 12 opposite to the viewing side.

According to the present variant, it is possible to achieve an effect that is similar to the effect described above, and a complete black can be achieved in an absence of an electric field, and further it is possible to achieve a wide viewing angle.

EXAMPLES

Hereinafter, examples of the present invention will be described.

Example 1

First, a coloring-purpose resin layer was formed on one side of a glass substrate by applying a coloring-purpose resin solution in which pigments are dispersed, and a transparent electrode layer was formed on the other side of the glass substrate by forming a film of indium tin oxide by sputtering. Thereafter, an upper substrate having a color filter and a transparent electrode pattern was fabricated by etching the coloring-purpose resin layer and the transparent electrode layer, respectively.

Further, a thin-film transistor, a scan line, a signal line and a pixel electrode were formed on a separate glass substrate to form a lower substrate.

Next, a polyimide alignment film was formed on a color filter side of the upper substrate and a pixel electrode side of the lower substrate, and rubbed in one direction with a rubbing cloth. After spreading spherical fine particles on the lower substrate, the lower substrate and the upper substrate were laid on top of each other and adhered with an epoxy resin adhesive agent to fabricate an empty cell. A nematic liquid crystal having positive dielectric anisotropy was injected into this empty cell, and a liquid crystal cell in an IPS mode was fabricated that has liquid crystal molecules having a homogeneous alignment in an absence of an electric field.

A capacitive sensor was fabricated by laminating an acrylic adhesive layer (first adhesive layer) to embed the transparent electrode pattern formed on the upper substrate. This upper substrate also serves as the transparent electrode of the capacitive sensor. Then, this transparent electrode pattern was connected to a wiring (not shown) formed at a peripheral portion of an effective display region of the upper substrate, and this wiring was connected to a controller IC which is provided externally.

Next, a retardation film, an antistatic layer having a surface resistance value of $2.0 \times 10^9 \Omega/\square$, and a first polarizer were laminated in this order on the viewing side of the liquid crystal cell, i.e., on the capacitive sensor, and an acrylic adhesive agent (second adhesive layer) and a second polarizer were laminated in this order on the other side of the liquid crystal cell. The antistatic layer was formed by affixing the acrylic pressure sensitive adhesive agent (thickness of 25 μm), in which bis(trifluoromethanesulfonyl)imide lithium is dispersed at 7 weight % against the total weight of the antistatic layer, to one side of the first polarizer.

Example 2

An input display device was fabricated that has a structure similar to that of Example 1, except that the antistatic layer having a surface resistance value of $8.0 \times 10^{10} \Omega/\square$ was used. An acrylic pressure sensitive adhesive agent (thickness of 25 μm), in which bis(trifluoromethanesulfonyl)imide lithium is dispersed at 2 weight % against the total weight of the antistatic layer was used as the antistatic layer.

Comparative Example 1

An input display device was fabricated that has a structure similar to that of Example 1, except that the antistatic layer having a surface resistance value of $5.0 \times 10^8 \Omega/\square$ is used. An acrylic pressure sensitive adhesive agent (thickness of 25 μm) in which bis(trifluoromethanesulfonyl)imide lithium is dispersed at 10 weight % against the total weight of the antistatic layer was used as the antistatic layer.

Comparative Example 2

An input display device was fabricated that has a structure similar to that of Example 1, except that the antistatic layer having a surface resistance value of $2.0 \times 10^{11} \Omega/\square$ is used. An acrylic pressure sensitive adhesive agent (thickness of 25 μm) in which bis(trifluoromethanesulfonyl)imide lithium is dispersed at 1 weight % against the total weight of the antistatic layer was used as the antistatic layer.

Method of Measuring Surface Resistance Value

In compliance with JIS K 7194, the surface resistance values in Examples 1 and 2, and Comparative Examples 1 and 2 were measured with a four terminal method.

Method of Evaluating Display Defect

Using an electrostatic discharge gun, static electricity was applied to a polarizer disposed on a viewing-side surface of the input display device, and a visual observation was carried out to determine whether there was any display defect.

Method of Evaluating Malfunctioning

Visual observation was performed in a state where the input display device of Examples 1, 2 and Comparative Examples 1, 2 were in use to determine whether there is any malfunctioning.

Results obtained by the aforementioned evaluation methods are indicated in Table 1.

TABLE 1

| | SURFACE RESISTANCE VALUE OF ANTISTATIC LAYER ($\Omega/\square$) | ANTISTATIC AGENT CONTENT (WEIGHT %) | DISPLAY DEFECT | MALFUNCTIONING | DETERMINATION |
|---|---|---|---|---|---|
| COMPARATIVE EXAMPLE 1 | $5.0 \times 10^8$ | 10 | NO | YES | x (NG) |
| EXAMPLE 1 | $2.0 \times 10^9$ | 7 | NO | NO | ○ (OK) |
| EXAMPLE 2 | $8.0 \times 10^{10}$ | 2 | NO | NO | ○ (OK) |
| COMPARATIVE EXAMPLE 2 | $2.0 \times 10^{11}$ | 1 | YES | NO | x (NG) |

Referring to the results in Table 1, as can be seen in Examples 1 and 2, with the input display device using an antistatic layer having a surface resistance value per unit area of $2.0 \times 10^9$ to $8.0 \times 10^{10} \Omega/\square$, even if the polarizer was charged by static electricity, a display defect was not produced in the liquid crystal layer. Also, malfunctioning of the capacitive sensor was not produced.

Figure 4:
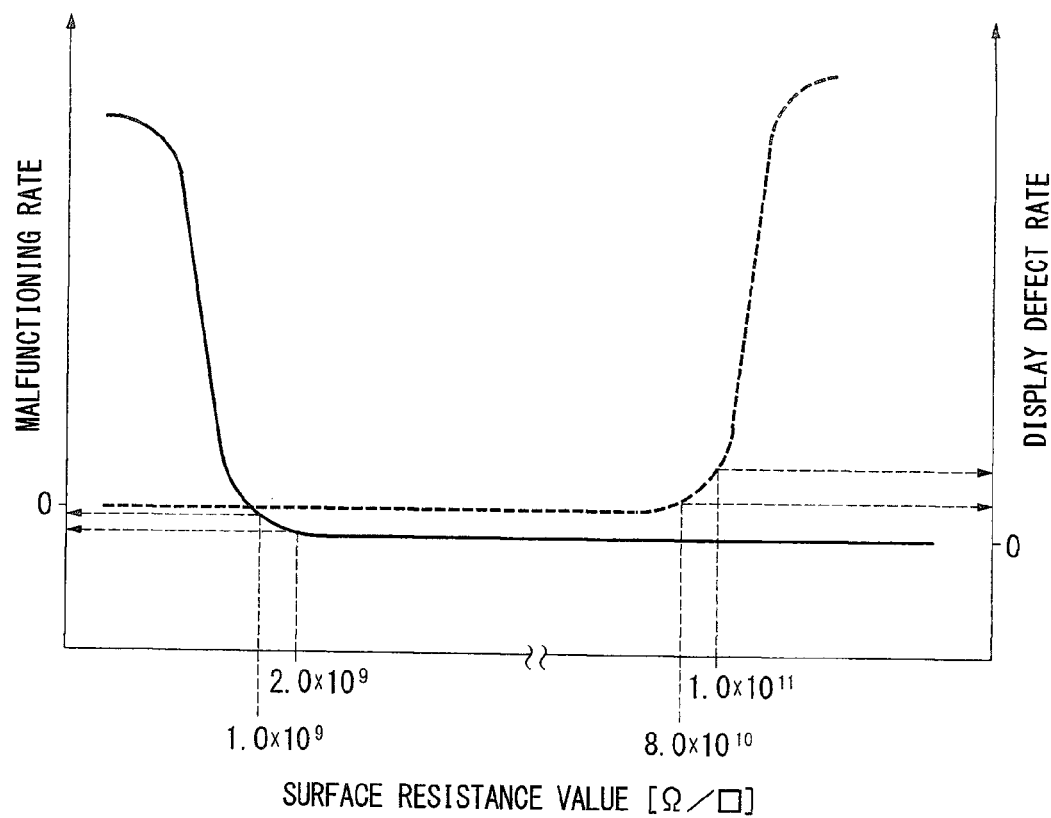
FIG. 4 is a graph showing a relationship between a surface resistance value of an antistatic layer of FIG. 1 and each of malfunctioning and a display defect occurring in the input display device.

On the other hand, as can be seen in Comparative Examples 1 and 2, in a case where the surface resistance value was less than $1.0 \times 10^9 \Omega/\square$, malfunctioning of the capacitive sensor occurred. Further, when the surface resistance value of the antistatic layer has exceeded $1.0 \times 10^{11} \Omega/\square$, a display defect of the liquid crystal layer occurred. Based on the results of these Examples and Comparative Examples, it is estimated that the relationship between the surface resistance value, the malfunctioning and the display defect is as shown in FIG. 4.

Therefore, with the configuration of the input display device of the present invention, it was found that occurrence of the display defect can be prevented while preventing occurrence of the malfunctioning by setting the surface resistance value per unit area to $1.0 \times 10^9$ to $1.0 \times 10^{11} \Omega/\square$, and more specifically to $2.0 \times 10^9$ to $8.0 \times 10^{10} \Omega/\square$.

INDUSTRIAL APPLICABILITY

The input display device of the present invention has no particular limitation for its application, and preferably, it can be employed in portable terminals such as smart phones or tablet terminals (also referred to as Slate PCs).

What is claimed is:
1. An input display device comprising:
   a liquid crystal layer containing liquid crystal molecules that are homogeneously aligned in an absence of an electric field;
   a first polarizer disposed on a viewing side of the liquid crystal layer;
   a capacitive sensor disposed between the first polarizer and the liquid crystal layer; and an antistatic layer disposed between the first polarizer and the capacitive sensor, the antistatic layer being attached to the first polarizer, the first polarizer, the antistatic layer, the capacitive sensor and the liquid crystal layer being laminated in this order from the viewing side, wherein the capacitive sensor has a transparent substrate, a transparent electrode pattern formed on the transparent substrate, and a first adhesive layer formed on the transparent substrate to embed the transparent electrode pattern, and wherein the antistatic layer has a surface resistance value of $1.0 \times 10^9$ to $1.0 \times 10^{11} \Omega/\square$.

2. The input display device according to claim 1, further comprising a retardation film that widens a viewing angle on the viewing side, the retardation film being disposed between the antistatic layer and the first adhesive layer.

3. The input display device according to claim 1, wherein a second polarizer is disposed on a side of the liquid crystal layer opposite to the viewing side via a second adhesive layer.

4. The input display device according to claim 1, wherein the antistatic layer includes any one of a surface active agent, an alkaline metal salt, a polyhydric alcohol, a conductive fine particle and a conductive polymer.

5. The input display device according to claim 4, wherein the alkaline metal salt is bis(trifluoroalkanesulfonyl)imide alkaline metal salt.

* * * * *